(12) United States Patent
Tashiro et al.

(10) Patent No.: US 9,122,978 B2
(45) Date of Patent: Sep. 1, 2015

(54) IMAGE PROCESSING DEVICE AND METHOD, AND NON-TRANSITORY COMPUTER READABLE MEDIUM

(71) Applicant: FUJI XEROX CO., LTD., Tokyo (JP)

(72) Inventors: Yosuke Tashiro, Kanagawa (JP); Masaomi Sakamoto, Kanagawa (JP); Masaru Okutsu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/267,251

(22) Filed: May 1, 2014

(65) Prior Publication Data
US 2015/0092204 A1 Apr. 2, 2015

(30) Foreign Application Priority Data
Oct. 1, 2013 (JP) ................................. 2013-206755

(51) Int. Cl.
H04N 1/40 (2006.01)
G06K 15/02 (2006.01)

(52) U.S. Cl.
CPC .................................. *G06K 15/1878* (2013.01)

(58) Field of Classification Search
CPC ..... H04N 1/6033; H04N 1/6058; H04N 1/60; H04N 1/6055; H04N 1/603; H04N 1/6097; H04N 1/6025; H04N 2201/02425; H04N 2201/04717; H04N 2201/04793; H04N 1/00002; H04N 1/00015; H04N 1/00023; H04N 1/00031; H04N 1/00045; H04N 1/00087

USPC ........... 358/1.9, 2.1, 406, 504, 515–521, 527, 358/529, 500, 468
See application file for complete search history.

(56) References Cited

U.S. PATENT DOCUMENTS

| 6,381,037 B1 * | 4/2002 | Balasubramanian et al. ........................... 358/3.23 |
| 6,441,923 B1 * | 8/2002 | Balasubramanian et al. ........................... 358/3.23 |
| 7,684,084 B2 * | 3/2010 | Fan et al. ........................ 358/1.9 |

FOREIGN PATENT DOCUMENTS

JP A-9-6956 1/1997

* cited by examiner

*Primary Examiner* — Thomas D Lee
*Assistant Examiner* — Stephen M Brinich
(74) *Attorney, Agent, or Firm* — Oliff PLC

(57) ABSTRACT

An image processing device includes an accepting unit, and a conversion information generating unit. The accepting unit accepts items of read data in a device-dependent color space that are generated by reading color patches, items of reference data in a device-independent color space of the color patches, and items of specific color component data each indicating a specific color component in a corresponding one of the color patches. The conversion information generating unit generates conversion information reflecting the presence or amount of a specific color component included in each color patch as information for converting input data in the device-dependent color space to output data in the device-independent color space, on the basis of the items of read data, the items of reference data, and the items of specific color component data.

13 Claims, 17 Drawing Sheets

IMAGE PROCESSING DEVICE AND METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-206755 filed Oct. 1, 2013.

BACKGROUND (i) Technical Field

The present invention relates to an image processing device and method, and to a non-transitory computer readable medium.

(ii) Related Art

There are image processing devices that convert data generated by an image reading device such as a scanner (data in a device-dependent color space) to data in a device-independent color space. Conversion information for performing such conversion is generated as follows. First, multiple items of data in a device-dependent color space are generated by reading multiple color patches with an image reading device, and multiple items of data in a device-independent color space are generated by performing colorimetry of the color patches. On the basis of the multiple items of data in a device-dependent color space and the multiple items of data in a device-independent color space, conversion information for converting data in a device-dependent color space to data in a device-independent color space is generated.

By the way, in the case where a color patch for generating conversion information includes a black component (K color component), data in a device-dependent color space generated by reading that color patch (such as RGB data) does not necessarily have a one-to-one correspondence with data in a device-independent color space of that color patch (such as Lab data), and the accuracy of conversion information generated using such RGB data and Lab data is lowered. As a result, the accuracy of conversion from RGB data to Lab data is lowered.

Lowering of the accuracy of conversion information is described here. For example, in the case where a color patch is formed using cyan (C), magenta (M), yellow (Y), and black (K) as color materials, even if the amounts of CMY color components are changed, a color patch in the same color (color with the same Lab values) is generated by changing the amount of a K color component. That is, there are different items of CMYK data with the same Lab values. Therefore, in the case where multiple color patches are formed by changing the amounts of CMYK color components, these color patches may include color patches in the same color but with different combinations of CMYK. When these color patches are read to generate RGB data, different items of RGB data with the same Lab values are generated. In this manner, RGB data generated by reading a color patch including a K color component does not always have a one-to-one correspondence with Lab data of that color patch, and there are different items of RGB data with the same Lab values. When conversion information is generated using such RGB data and Lab data, the accuracy thereof is lowered. In this manner, the accuracy of conversion information is lowered in a color gamut including a K color component, and the accuracy of data conversion using that conversion information is lowered. Although the circumstances arising from a K color component have been described above, the same or similar circumstances may arise from other specific color components.

SUMMARY

According to an aspect of the invention, there is provided an image processing device including an accepting unit, and a conversion information generating unit. The accepting unit accepts items of read data in a device-dependent color space that are generated by reading color patches, items of reference data in a device-independent color space of the color patches, and items of specific color component data each indicating a specific color component in a corresponding one of the color patches. The conversion information generating unit generates conversion information reflecting the presence or amount of a specific color component included in each color patch as information for converting input data in the device-dependent color space to output data in the device-independent color space, on the basis of the items of read data, the items of reference data, and the items of specific color component data.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
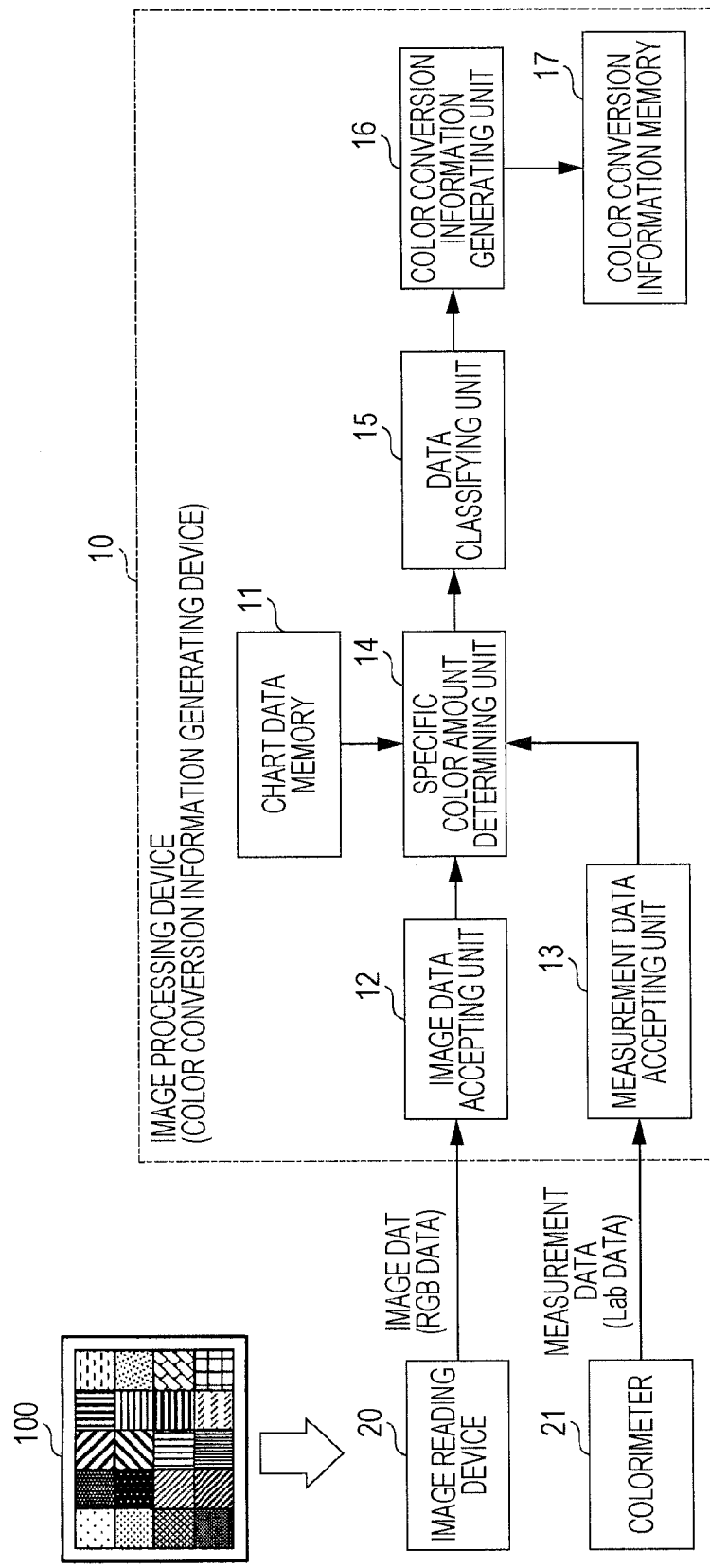
FIG. 1 is a block diagram illustrating an example of an image processing device (color conversion information generating device) according to a first exemplary embodiment.
Figure 2:
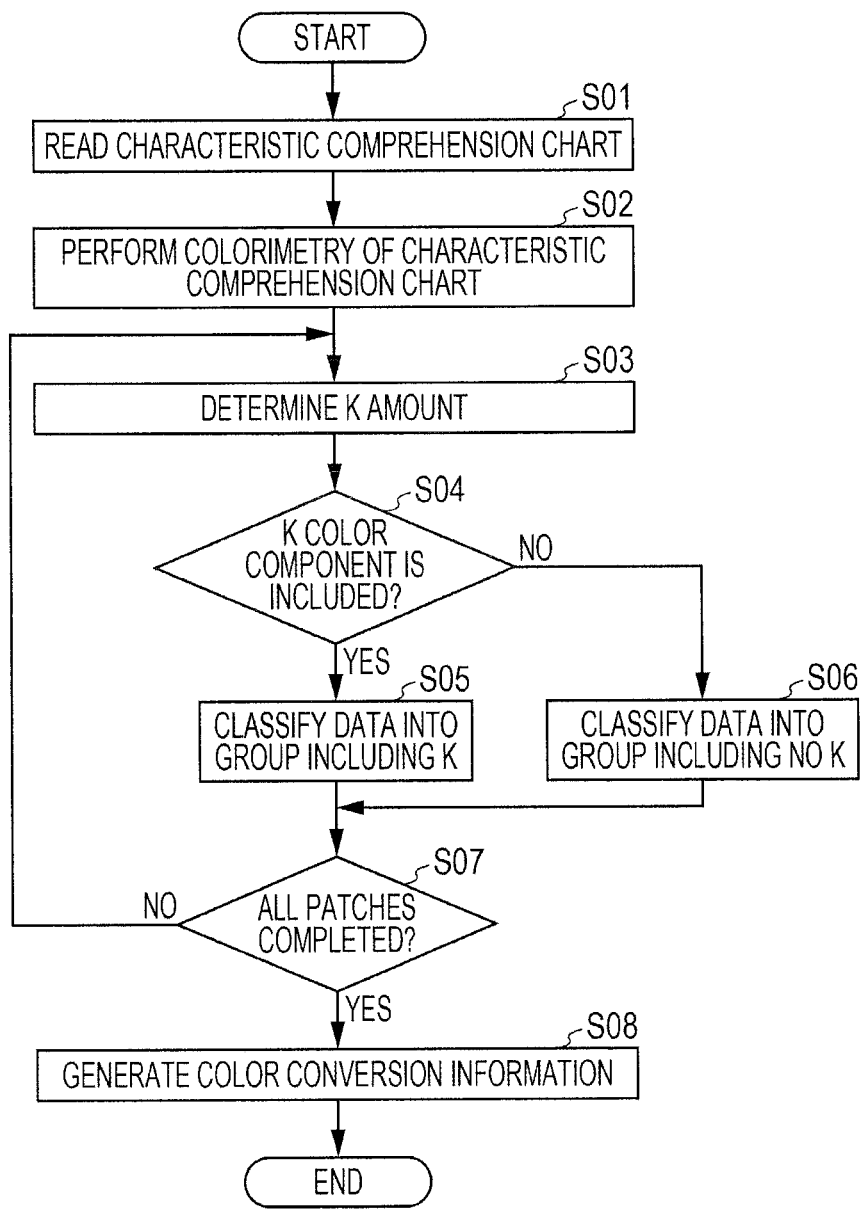
FIG. 2 is a flowchart illustrating an example of a color conversion information generating process according to the first exemplary embodiment.

A first exemplary embodiment of the present invention will be described. FIG. 2 illustrates an example of an image processing device (color conversion information generating device) according to the first exemplary embodiment of the present invention. An image processing device 10 (color conversion information generating device) according to the first exemplary embodiment generates color conversion information for converting data in a color space that depends on a device such as an image reading device (device-dependent color space) to data in a color space that is independent of a device (device-independent color space).

First, a characteristic comprehension chart 100 used for generating color conversion information will be described. In the characteristic comprehension chart 100, multiple color patches in different colors are formed. Each color patch is formed by an image forming device such as a printer that is not illustrated in the drawings, and is an image in accordance with an arbitrary combination of cyan (C), magenta (M), yellow (Y), and black (K), for example. Typically, one color patch is configured as a small rectangular area (printed portion in a uniform color). For example, the image forming device forms multiple color patches by performing printing while changing the amounts of CMYK color components within the range of 0% to 100%. Although the number of combinations of CMYK (the number of color patches) is arbitrary, the accuracy of color conversion information improves as the number of combinations becomes greater. Note that multiple color patches may include color patches with the same measurement values (L*a*b* values) but with different amounts of CMYK.

An image reading device 20 is a reading device such as a scanner or a digital camera and generates image data of each color patch formed in the characteristic comprehension chart 100 by reading the color patch. Image data generated by the image reading device 20 is data in a device-dependent color space. In this exemplary embodiment, the image reading device 20 generates, for example, data represented by a combination of red (R), green (G), and blue (B) (RGB data). Note that data other than RGB data may be used as data in a device-dependent color space.

A colorimeter 21 performs colorimetry of the color patches formed in the characteristic comprehension chart 100 and outputs the measurement values (measurement data) of each color patch. The measurement values are data in a device-independent color space (such as the L*a*b* color space) (L*a*b data). In the following description, "L*a*b data" is abbreviated as "Lab data". Note that data other than Lab data may be used as data in a device-independent color space. Although the colorimeter 21 is generally used, data prepared in advance corresponding to the characteristic comprehension chart 100 may be used as reference data.

Next, the image processing device 10 according to the first exemplary embodiment will be described. The image processing device 10 includes a chart data memory 11, an image data accepting unit 12, a measurement data accepting unit 13, a specific color amount determining unit 14, a data classifying unit 15, a color conversion information generating unit 16, and a color conversion information memory 17. Note that the image processing device 10 may be included in the image reading device 20.

The chart data memory 11 stores chart layout information. The chart layout information is information indicating the presence of a specific color component in each color patch in the characteristic comprehension chart 100, or information indicating the amount of a specific color component in each color patch. The specific color component is, for example, a black component (K color component). Note that the specific color component is not limited to a K color component and may be a white component, a metallic color component, a gray component, a light magenta component, a light cyan component, or the like. Alternatively, multiple specific color components may be used. For example, color patches may be formed with CMYKW color components including a white component (W component) in addition to CMYK color components. Chart layout information is generated, for example, at a stage of generating the characteristic comprehension chart 100. For example, in the case of generating the characteristic comprehension chart 100 using a specific print system, chart layout information is generated using part of the original data of that characteristic comprehension chart 100 (for example, a K color component, that is, K version). Chart layout information generated by such a system is stored in the chart data memory 11 via an accepting unit that is not illustrated in the drawings. In the case where the image processing device 10 has the function of printing the characteristic comprehension chart 100, as with the above case, part of the original data (such as K data) is stored as chart layout information in the chart data memory 11.

The image data accepting unit 12 accepts image data (RGB data) of each color patch, which is generated by the image reading device 20.

The measurement data accepting unit 13 accepts measurement data (Lab data) of each color patch, which is measured by the colorimeter 21.

The specific color amount determining unit 14 determines the presence of a K color component in RGB data (color patch) obtained by the image data accepting unit 12 by referring to the chart layout information stored in the chart data memory 11. Similarly, the specific color amount determining unit 14 determines the presence of a K color component in Lab data (color patch) obtained by the measurement data accepting unit 13 by referring to the chart layout information. Determination of the presence of a K color component is executed for each color patch.

The data classifying unit 15 classifies RGB data and Lab data of a color patch including a K color component into a group including a K color component, and classifies RGB data and Lab data of a color patch including no K color component into a group including no K color component.

On the basis of multiple items of RGB data including a K color component and multiple items of Lab data including a K color component, the color conversion information generating unit 16 generates first color conversion information (color conversion information including K) for converting RGB data to Lab data. In addition, on the basis of multiple items of RGB data including no K color component and multiple items of Lab data including no K color component, the color conversion information generating unit 16 generates second color conversion information (color conversion information including no K) for converting RGB data to Lab data.

Color conversion information may be a function (color conversion model) indicating the conversion characteristics between RGB data and Lab data, or a table such as a look up table (LUT). For example, a high-order polynomial or a neural network is used as a color conversion model. For example, the color conversion information generating unit 16 causes a neural network to learn a data set of multiple items of RGB data and multiple items of Lab data as training data, thereby obtaining a color conversion model. In addition, the color conversion information generating unit 16 may use the color conversion model to generate an LUT indicating the corresponding relationship between RGB data and Lab data at arbitrary lattice points.

The color conversion information memory 17 stores the first color conversion information (color conversion information including K) and the second color conversion information (color conversion information including no K).

Figure 3:
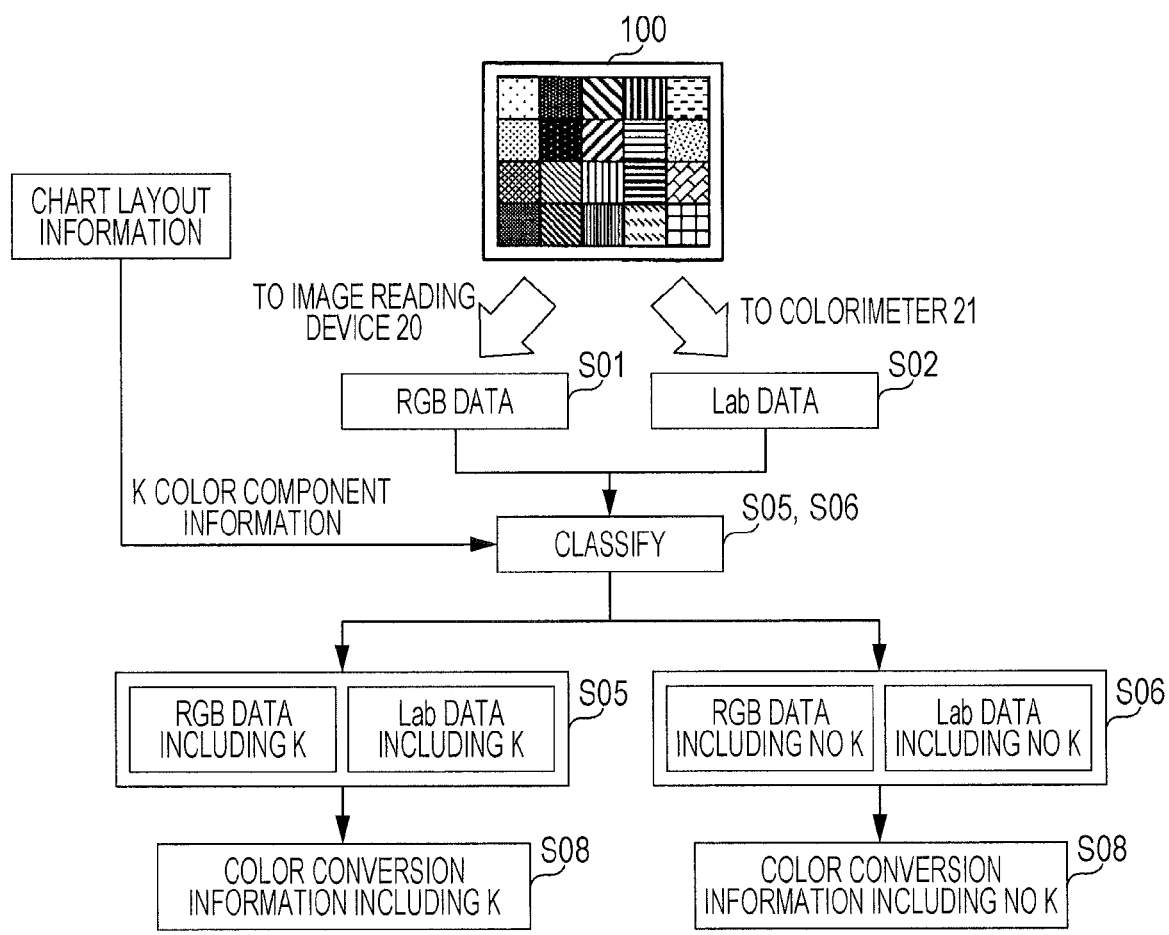
FIG. 3 is a flowchart illustrating an example of a color conversion information generating process according to the first exemplary embodiment.

Next, with reference to the flowcharts illustrated in FIGS. 2 and 3, the operation of the image processing device 10 (color conversion information generating device) according to the first exemplary embodiment will be described.

First, the image reading device 20 reads each color patch formed in the characteristic comprehension chart 100, thereby generating RGB data of the color patch (S01). The image data accepting unit 12 obtains the RGB data of each color patch from the image reading device 20.

In addition, the colorimeter 21 performs colorimetry of each color patch formed in the characteristic comprehension chart 100 (S02). The measurement data accepting unit 13 obtains Lab data of each color patch from the colorimeter 21.

The specific color amount determining unit 14 determines the presence of a K color component in RGB data and Lab data (color patch) by referring to the chart layout information (S03). In the case where a color patch includes a K color component (Yes in S04), the data classifying unit 15 classifies RGB data and Lab data of that color patch into a group including a K color component (S05). In the case where a color patch includes no K color component (No in S04), the data classifying unit 15 classifies RGB data and Lab data of that color patch into a group including no K color component (S06). The image processing device 10 performs the processing in steps S03 to S06 for all color patches read by the image reading device 20.

In the case where the processing in steps S03 to S06 of all color patches ends (Yes in S07), the color conversion information generating unit 16 generates color conversion information for converting RGB data to Lab data, on the basis of multiple items of RGB data and multiple items of Lab data (S08). Specifically, the color conversion information generating unit 16 generates color conversion information including K (first color conversion information) for converting RGB data to Lab data, on the basis of multiple items of RGB data including a K color component and multiple items of Lab data including a K color component. In addition, the color conversion information generating unit 16 generates color conversion information including no K (second color conversion information) for converting RGB data to Lab data, on the basis of multiple items of RGB data including no K color component and multiple items of Lab data including no K color component. The color conversion information memory 17 stores the color conversion information including K and the color conversion information including no K.

As described above, by separately generating the color conversion information including K and the color conversion information including no K, more accurate color conversion information is generated, compared with the case in which color conversion information is generated while making no distinction between data (RGB data and Lab data) including a K color component and data (RGB data and Lab data) including no K color component. Hitherto, conversion information has been generated only from the reading result and the measurement result of the characteristic comprehension chart 100. However, according to the first exemplary embodiment, information for data conversion is generated by additionally taking into consideration electronic chart layout information (K color component information) that has been prepared separately from the physical characteristic comprehension chart 100. Therefore, the problem that the accuracy of conversion is lowered by the presence of a K color component is cleared up or disappears. In other words, conversion information that is more accurate than before is generated.

Here, the accuracy of color conversion information will be described. RGB data including no K color component and Lab data including no K color component have a one-to-one correspondence and a linear corresponding relationship. That is, there is only one item of RGB data that represents one item of Lab data including no K color component. In contrast, RGB data including a K color component and Lab data including a K color component do not have a one-to-one correspondence and have a non-linear corresponding relationship. Therefore, color conversion information including no K that is generated using RGB data including no K color component and Lab data including no K color component has higher accuracy than color conversion information including K that is generated using RGB data including a K color component and Lab data including a K color component.

If conversion information is generated without making a distinction between data (RGB data and Lab data) including a K color component and data (RGB data and Lab data) including no K color component, because the corresponding relationship between RGB data including a K color component and Lab data including a K color component is non-linear, the overall accuracy of conversion information becomes lower. In this case, although RGB data including no K color component and Lab data including no K color component originally have a linear corresponding relationship, because color conversion information is generated without making a distinction from data (RGB data and Lab data) including a K color component whose corresponding relationship is non-linear, the accuracy of color conversion information for converting RGB data including no K color component to Lab data also becomes lower.

To this end, as in the first exemplary embodiment, by generating color conversion information including no K on the basis of data including no K color component while making a distinction between data (RGB data and Lab data) that includes no K color component and has a linear corresponding relationship and data (RGB data and Lab data) that includes a K color component and has a non-linear corresponding relationship, lowering of the accuracy of color conversion information including no K is prevented or moderated. In contrast, although the accuracy of color conversion information including K becomes lower than the accuracy of color conversion information including no K, the overall accuracy of color conversion information is improved because the accuracy of color conversion information including no K is improved.

Note that the specific color component is not limited to a K color component and may be a color component that causes the corresponding relationship between RGB data and Lab data to be non-linear. Even in the case where the specific color component is a color component other than a K color component, by generating color conversion information on the basis of each of data (RGB data and Lab data) that includes no specific color component and has a linear corresponding relationship and data (RGB data and Lab data) that includes a specific color component and has a non-linear corresponding relationship while making a distinction between the two types of data, the overall accuracy of color conversion information is improved, compared with the case in which no distinction is made between the two types of data.

In addition, in the case where color patches are formed with color materials including multiple specific color components, the image processing device 10 may generate three or more items of color conversion information. Also in this case, the image processing device 10 generates color conversion information including specific color components and color conversion information including no specific color components. For example, in the case where color patches are formed with CMYKW color materials, the image processing device 10 generates color conversion information including KW, color conversion information including no K, and color conversion information including no W on the basis of each of data (RGB data and Lab data) including KW, data (RGB data and Lab data) including no K, and data (RGB data and Lab data) including no W. Alternatively, the image processing device 10 may generate color conversion information including no KW on the basis of data (RGB data and Lab data) including no KW. In this manner, even in the case where three or more items of color conversion information are generated, the overall accuracy of color conversion information is improved because the accuracy of color conversion information including no specific color components is improved, compared with color conversion information generated without making a distinction among these types of data.

Figure 4:
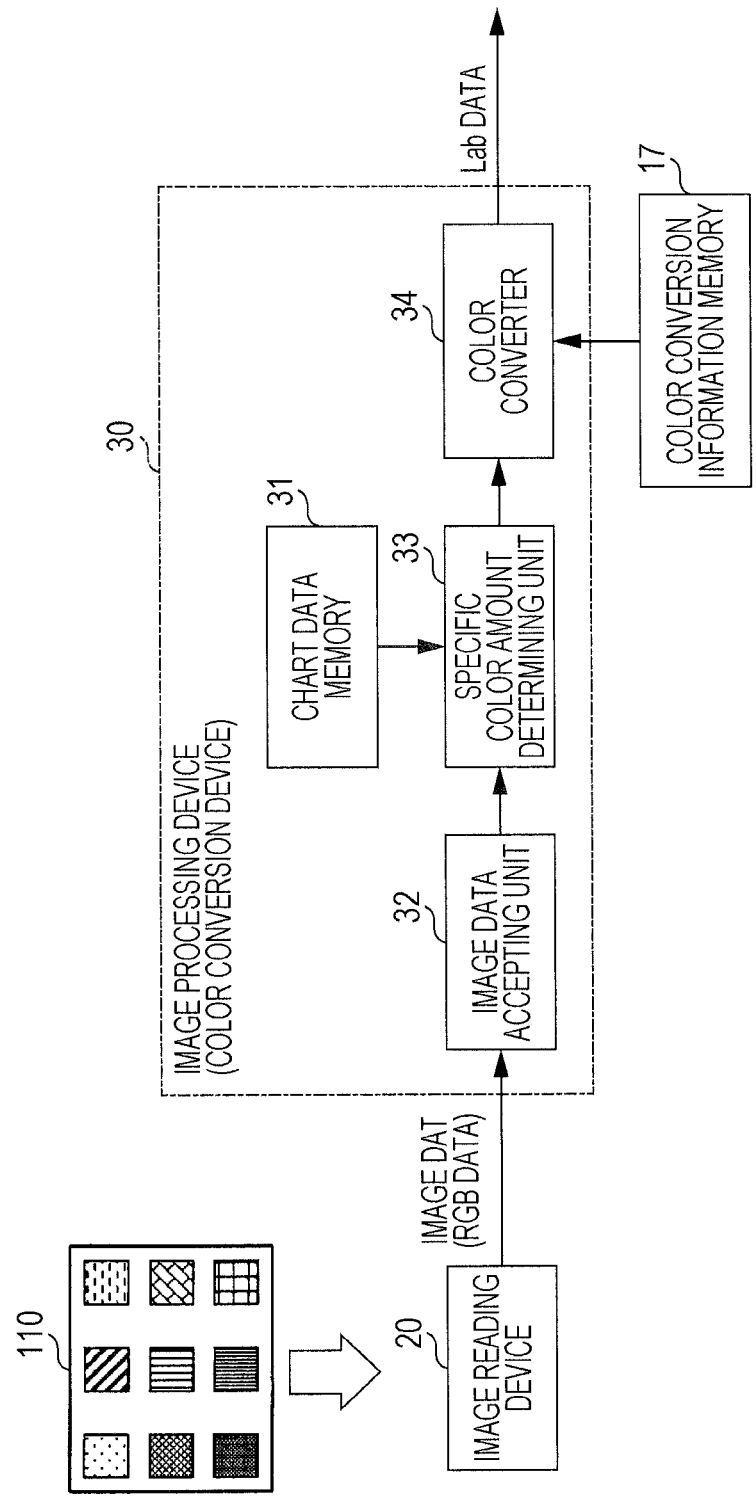
FIG. 4 is a block diagram illustrating an example of an image processing device (color conversion device) according to the first exemplary embodiment.

Next, a color conversion device that performs color conversion using color conversion information including K and color conversion information including no K will be described. FIG. 4 illustrates an example of an image processing device (color conversion device) according to the first exemplary embodiment. An image processing device 30 (color conversion device) according to the first exemplary embodiment converts data in a device-dependent color space (RGB data) to data in a device-independent color space (Lab data) by using color conversion information including K or color conversion information including no K. In the first exemplary embodiment, for example, the case in which the image processing device 30 converts RGB data generated by reading an evaluation chart 110 to Lab data will be described. Note that the image processing device 30 may be included in the image processing device 10 or may be included in the image reading device 20.

First, the evaluation chart 110 will be described. In the evaluation chart 110, multiple color patches are formed. Each color patch is formed by an image forming device such as a printer that is not illustrated in the drawings, and is an image in accordance with an arbitrary combination of CMYK. For example, the image forming device forms multiple color patches by performing printing while changing the amounts of CMYK color components within the range of 0% to 100%. Preferably, chart layout information is generated in advance by using part of the original data (K color component information) at the time of printing the evaluation chart 110, and the chart layout information is stored in a chart data memory 31. In this case, at the time of converting image data (such as RGB data) to Lab data, the presence of a K color component is determined by referring to K color component information of this image data, and conversion information to be used in converting this image data is selected in accordance with the determination result. Note that the evaluation chart 110 may be the same as or different from the characteristic comprehension chart 100.

The image reading device 20 generates image data (RGB data) of each color patch formed in the evaluation chart 110 by reading the color patch.

The image processing device 30 according to the first exemplary embodiment includes the chart data memory 31, an image data accepting unit 32, a specific color amount determining unit 33, and a color converter 34.

The chart data memory 31 stores chart layout information. The chart layout information is information indicating the presence of a specific color component in each color patch in the evaluation chart 110, or information indicating the amount of a specific color component in each color patch. In the first exemplary embodiment, the specific color component is, for example, a K color component. Note that the specific color component is not limited to a K color component and may be another color component.

The image data accepting unit 32 accepts image data (RGB data) of each color patch, which is generated by the image reading device 20.

The specific color amount determining unit 33 determines the presence of a K color component in RGB data (color patch) obtained by the image data accepting unit 32, by referring to the chart layout information stored in the chart data memory 31.

The color converter 34 converts RGB data obtained by the image data accepting unit 32 to Lab data, on the basis of color conversion information in accordance with the presence of a K color component. For example, in the case where RGB data obtained by the image data accepting unit 32 is image data of a color patch including a K color component, the color converter 34 obtains color conversion information including K from the color conversion information memory 17, and converts the RGB data to Lab data using the color conversion information including K. In contrast, in the case where RGB data obtained by the image data accepting unit 32 is image data of a color patch including no K color component, the color converter 34 obtains color conversion information including no K from the color conversion information memory 17, and converts the RGB data to Lab data using the color conversion information including no K.

Figure 5:
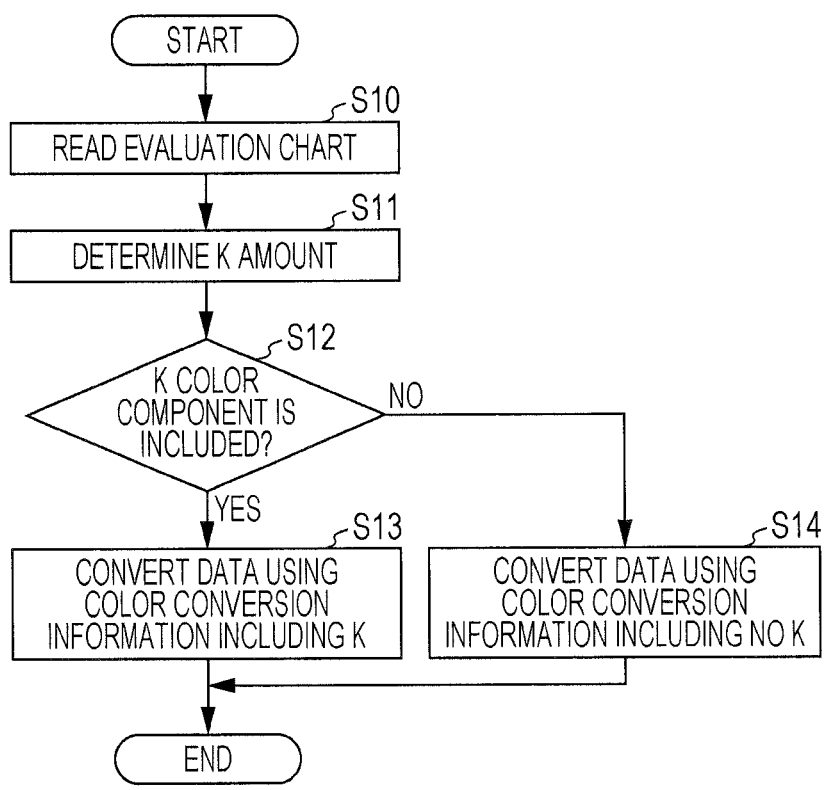
FIG. 5 is a flowchart illustrating an example of a color conversion process according to the first exemplary embodiment.
Figure 6:
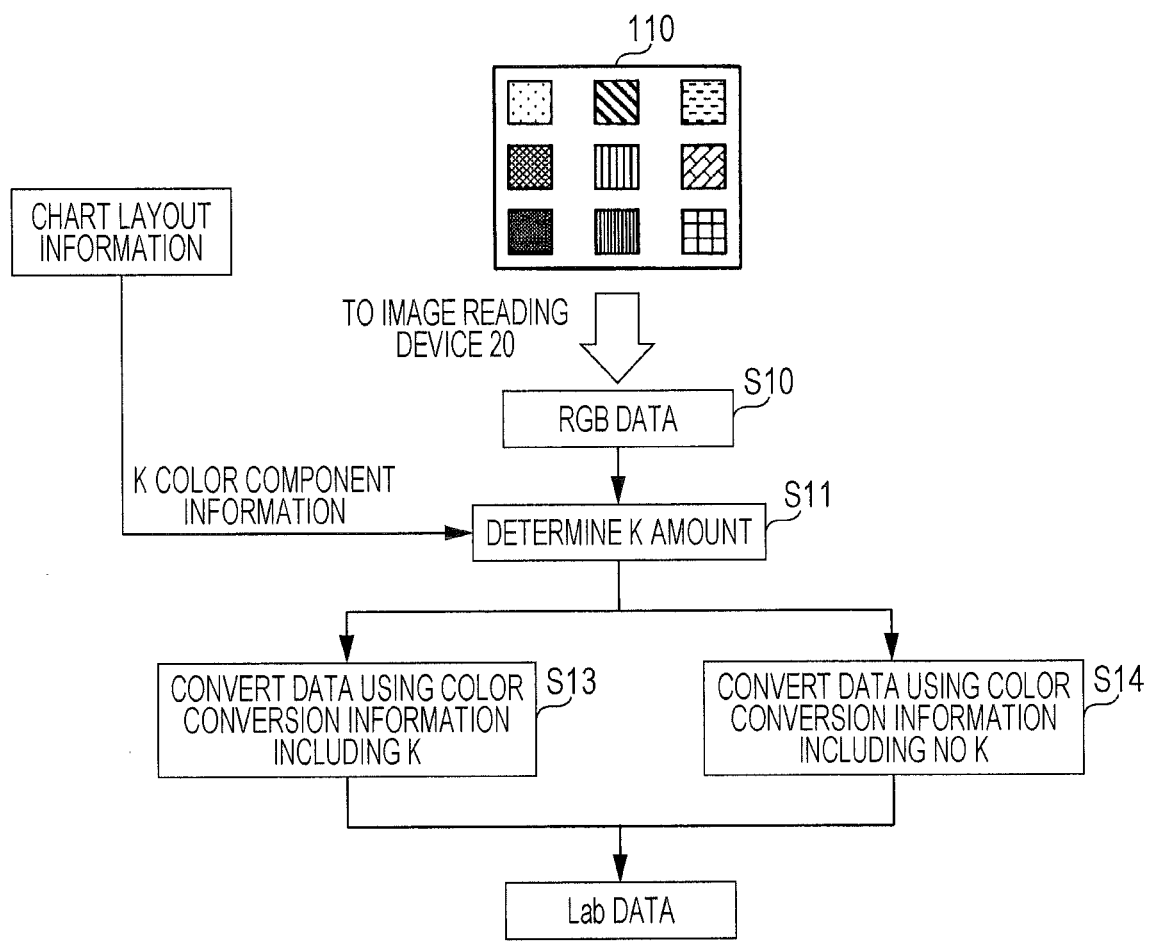
FIG. 6 is a flowchart illustrating an example of a color conversion process according to the first exemplary embodiment.

Next, with reference to the flowcharts illustrated in FIGS. 5 and 6, the operation of the image processing device 30 (image conversion device) according to the first exemplary embodiment will be described.

First, the image reading device 20 reads each color patch formed in the evaluation chart 110, thereby generating RGB data of the color patch (S10). The image data accepting unit 32 obtains the RGB data of each color patch from the image reading device 20.

The specific color amount determining unit 33 determines the presence of a K color component in RGB data (color patch) by referring to the chart layout information (S11).

In the case where a color patch includes a K color component (Yes in S12), the color converter 34 converts RGB data of the color patch to Lab data using color conversion information including K (S13). In contrast, in the case where a color patch includes no K color component (No in S12), the color converter 34 converts RGB data of the color patch to Lab data using color conversion information including no K (S14).

As described above, by performing conversion while switching between color conversion information including K and color conversion information including no K in accordance with the presence of a K color component in each color patch, the accuracy of conversion is improved, compared with the case in which conversion is performed using color conversion information generated without making a distinction between data including a K color component and data including no K color component. That is, by converting RGB data including no K color component to Lab data using color conversion information including no K, the accuracy of conversion from RGB data including no K color component to Lab data is improved, compared with the case in which RGB data including no K color component is converted to Lab data using color conversion information generated without making a distinction between data including a K color component and data including no K color component. Because of this improvement, the overall accuracy of conversion is improved.

Note that the image processing device 10 (color conversion information generating device) according to the above-described first embodiment classifies RGB data and Lab data in accordance with the presence of a K color component in each color patch. In another example, RGB data and Lab data may be classified in accordance with the lightness (L*) of each color patch. Also in this case, the image processing device 10 generates color conversion information on the basis of classified data. For example, the image processing device 10 may make a distinction between data (RGB data and Lab data) of a color patch whose lightness L* is greater than or equal to a predetermined threshold and data (RGB data and Lab data) of a color patch whose lightness L* is less than the threshold, and, may generate color conversion information on the basis of these classified items of data. The image processing device 30 (color conversion device) selects color conversion information in accordance with the lightness L* of a color patch and converts data.

Next, exemplary applications of the image processing device 30 according to the first exemplary embodiment will be described. First, a first exemplary application will be described. In the first exemplary application, the image processing device 30 according to the first exemplary embodiment is used as a colorimeter at the time of executing a print simulation. A print simulation is executed in order to correct information (color information) regarding the colors of image data such that the colors of an image formed on a sheet by a printer become closer to the colors of an image printed by a printing press. For example, before printing with a printing press starts, the colors of an image may be checked using a printer. In such a case, a print simulation is executed. Whether the colors of an image formed by a printer are close to the colors of an image printed by a printing press is preferably evaluated on the basis of measurement values (such as Lab data) obtained by performing colorimetry of the colors of the image formed by the printer using a colorimeter. However, because a colorimeter is expensive or it takes a long measurement time, an evaluation using a colorimeter is limited. On the other hand, by using the image processing device 30 according to the first exemplary embodiment, colorimetry is performed more simply and in a shorter period of time than the case in which a colorimeter is used. In addition, lowering of the conversion accuracy is prevented by performing conversion while switching between color conversion information including K and color conversion information including no K in accordance with the presence of a K color component in each color patch.

For example, in the case of executing a print simulation, the evaluation chart 110 is generated by forming multiple color patches on a sheet by using a printer, the multiple color patches in the evaluation chart 110 are read by the image reading device 20, and RGB data of each color patch is converted by the image processing device 30 (color conversion device) to Lab data. In the case where the difference between the Lab data and a reference value is greater than or equal to a threshold, adjustment of a profile for correcting the color information is prompted, the profile is automatically adjusted, or control parameters of the printer are adjusted such that the difference between the Lab data and the reference value is minimized. Alternatively, the evaluation chart 110 may be generated by printing multiple color patches by using a printing press, the multiple color patches in the evaluation chart 110 may be read by the image reading device 20, and RGB data of each color patch may be converted by the image processing device 30 to Lab data. Also in this case, in the case where the difference between Lab data of the evaluation chart 110 formed by a printer and Lab data of the evaluation chart 110 printed by a printing press is greater than or equal to a threshold, a process for minimizing the difference is executed. In this manner, since the image reading device 20 and the image processing device 30 function as a colorimeter, it becomes unnecessary to separately prepare a colorimeter.

Next, a second exemplary application will be described. The colors of an image formed by a printer may vary depending on the number of days the printer is operating, for example. Thus, variations of the colors may be managed. In this case, color patches formed by the printer are read by the image reading device 20, and Lab data is generated using the image processing device 30 (image conversion device) according to the first exemplary embodiment. Accordingly, color variations are more easily managed, compared with the case in which the first exemplary embodiment is not used.

Next, a third exemplary embodiment will be described. Even in the case where an image in the same color is formed on a sheet by a printer, the color may be different at two edges of the sheet. For example, the color may become darker at one edge than at the other edge. In this case, the image on the sheet is read by the image reading device 20, and, with the use of the image processing device 30 (color conversion device) according to the first exemplary embodiment, Lab data of the image formed in a central portion of the sheet and Lab data of the image formed at the edges are obtained. The difference between the Lab data of the image in the central portion and the Lab data of the image at the edges is obtained, and control parameters of the printer are adjusted to minimize the difference between the edges. In this manner, according to the first exemplary embodiment, a color difference is more easily measured, compared with the case in which the first exemplary embodiment is not used.

Note that the above-described image processing devices 10 and 30 are realized by cooperation between hardware resources and software, for example. Specifically, the image processing devices 10 and 30 each include a processor such as a central processing unit (CPU) that is not illustrated in the drawings. The processor reads and executes a program stored in a memory device that is not illustrated in the drawings, thereby realizing the functions of the image processing devices 10 and 30. The program is stored in the memory device via a storage medium such as a compact disc (CD) or a digital versatile disc (DVD) or communication means such as a network.

Second Exemplary Embodiment

Figure 7:
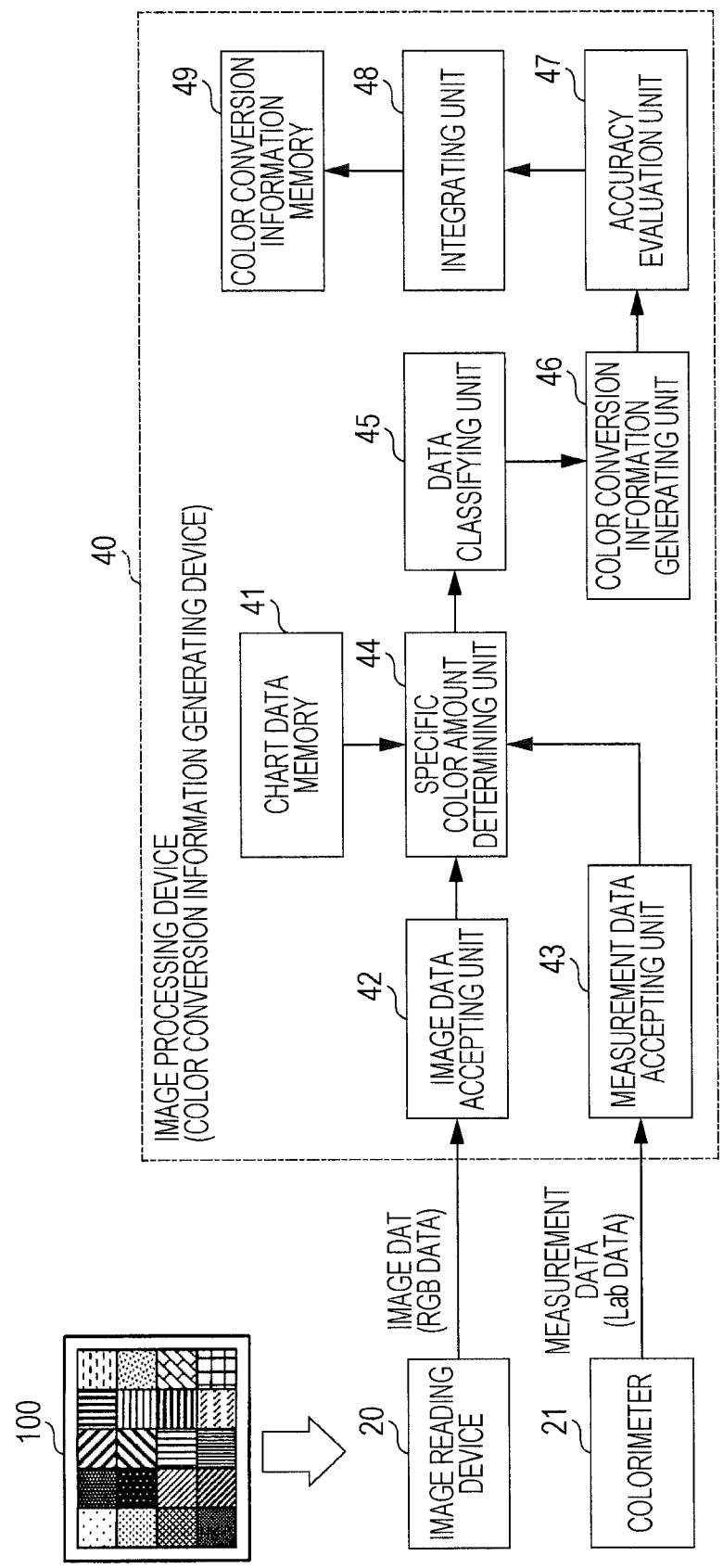
FIG. 7 is a block diagram illustrating an example of an image processing device (color conversion information generating device) according to a second exemplary embodiment.

Next, a second exemplary embodiment will be described. FIG. 7 illustrates an example of an image processing device (color conversion information generating device) according to the second exemplary embodiment of the present invention. An image processing device 40 (color information generating device) according to the second exemplary embodiment generates color conversion information for converting data in a device-dependent color space to data in a device-independent color space.

As in the first exemplary embodiment, the image reading device 20 generates image data (RGB data) of each color patch formed in the characteristic comprehension chart 100 by reading the color patch. In addition, the colorimeter 21 performs colorimetry of each color patch formed in the characteristic comprehension chart 100, and outputs the measurement data (Lab data) of each color patch.

The image processing device 40 according to the second exemplary embodiment includes a chart data memory 41, an image data accepting unit 42, a measurement data accepting unit 43, a specific color amount determining unit 44, a data classifying unit 45, a color conversion information generating unit 46, an accuracy evaluation unit 47, an integrating unit 48, and a color conversion information memory 49. Note that the image processing device 40 may be included in the image reading device 20.

The chart data memory 41 stores chart layout information of the characteristic comprehension chart 100, as in the chart data memory 11 according to the first exemplary embodiment. Also in the second exemplary embodiment, a specific color component is, for example, a black component (K color component). However, the specific color component is not limited to a K color component, as in the first exemplary embodiment.

The image data accepting unit 42 accepts image data (RGB data) of each color patch, which is generated by the image reading device 20.

The measurement data accepting unit 43 accepts measurement data (Lab data) of each color patch, which is measured by the colorimeter 21.

The specific color amount determining unit 44 determines the presence of a K color component in RGB data and Lab data (color patch) by referring to the chart layout information stored in the chart data memory 41, as in the specific color amount determining unit 14 according to the first exemplary embodiment.

The data classifying unit 45 classifies RGB data and Lab data of each color patch in accordance with the presence of a K color component, as in the data classifying unit 15 according to the first exemplary embodiment.

On the basis of multiple items of RGB data including a K color component and multiple items of Lab data including a K color component, the color conversion information generating unit 46 generates a color conversion model including K (first color conversion model) for converting RGB data to Lab data, and, on the basis of the color conversion model including K, generates a look up table including K (LUT including K; first LUT) for converting RGB data to Lab data. In addition, on the basis of multiple items of RGB data including no K color component and multiple items of Lab data including no K color component, the color conversion information generating unit 46 generates a color conversion model including no K (second color conversion model) for converting RGB data to Lab data, and, on the basis of the color conversion model including no K, generates a look up table including no K (LUT including no K; second LUT) for converting RGB data to Lab data.

The accuracy evaluation unit 47 converts image data of the same color using the LUT including K and the LUT including no K, and, on the basis of each item of data generated by the conversion, evaluates the LUT including K and the LUT including no K. For example, the accuracy evaluation unit 47 obtains the difference (first difference) between Lab data generated by converting RGB data of a color patch in the characteristic comprehension chart 100 using the LUT including K and Lab data obtained by performing colorimetry of the color patch using the colorimeter 21. In addition, the accuracy evaluation unit 47 obtains the difference (second difference) between Lab data generated by converting RGB data of the color patch in the characteristic comprehension chart 100 using the LUT including no K and Lab data generated by performing colorimetry of the color patch using the colorimeter 21. The accuracy evaluation unit 47 compares the first difference and the second difference, and selects an LUT (conversion parameter) with a smaller difference as an LUT (conversion parameter) for the color patch, from among the LUT including K and the LUT including no K. The accuracy evaluation unit 47 obtains the first difference and the second difference for each color patch in the characteristic comprehension chart 100, and selects one of the LUT including K and the LUT including no K for each color patch.

The integrating unit 48 generates an integrated LUT serving as integrated color conversion information by integrating (merging) the LUT including K and the LUT including no K for each color patch, selected by the accuracy evaluation unit 47. The integrating unit 48 may determine the value at each lattice point by performing a weighed addition of the value at each lattice point of the LUT including K and the LUT including no K, or may perform smoothing processing or averaging processing of the value at each lattice point of the integrated LUT.

The color conversion information memory 49 stores the integrated color conversion information (integrated LUT).

Figure 8:
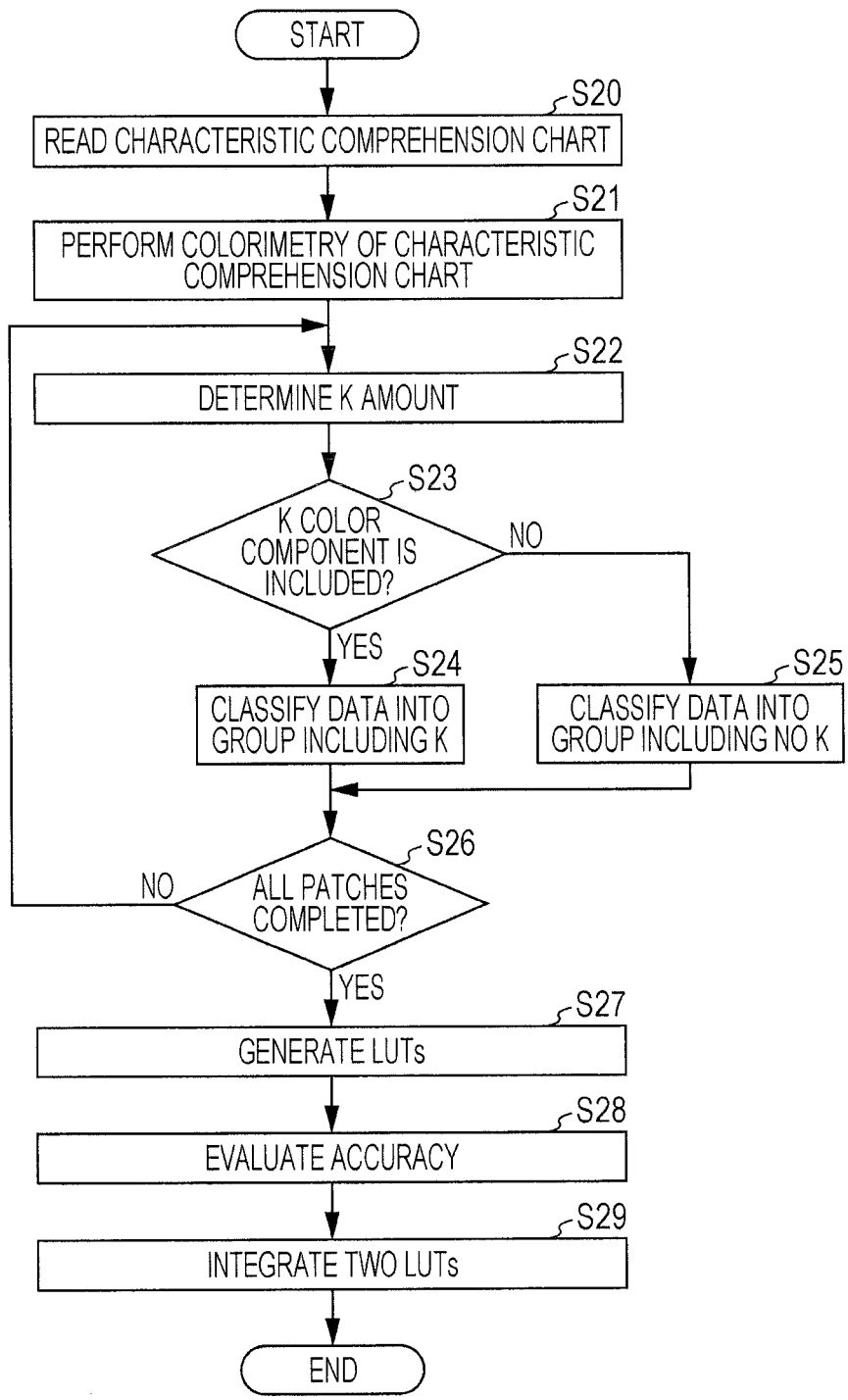
FIG. 8 is a flowchart illustrating an example of a color conversion information generating process according to the second exemplary embodiment.
Figure 9:
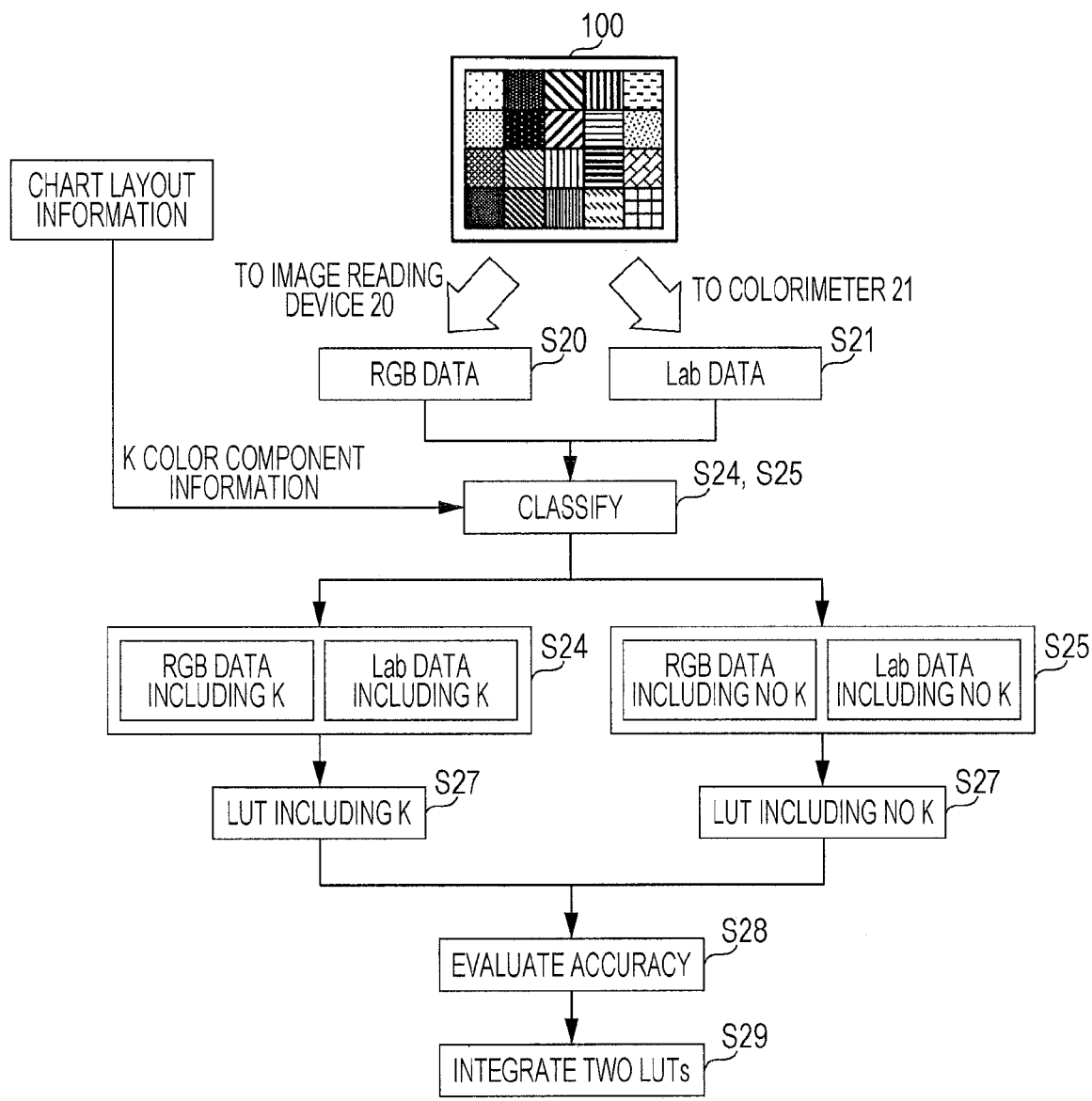
FIG. 9 is a flowchart illustrating an example of a color conversion information generating process according to the second exemplary embodiment.

Next, with reference to the flowcharts illustrated in FIGS. 8 and 9, the operation of the image processing device 40 (color conversion information generating device) according to the second exemplary embodiment will be described.

First, the image reading device 20 reads each color patch formed in the characteristic comprehension chart 100, thereby generating RGB data of the color patch (S20). The image data accepting unit 42 obtains the RGB data of each color patch from the image reading device 20.

In addition, the colorimeter 21 performs colorimetry of each color patch formed in the characteristic comprehension chart 100 (S21). The measurement data accepting unit 43 obtains Lab data of each color patch from the colorimeter 21.

The specific color amount determining unit 44 determines the presence of a K color component in RGB data and Lab data (color patch) by referring to the chart layout information (S22). In the case where a color patch includes a K color component (Yes in S23), the data classifying unit 45 classifies RGB data and Lab data of that color patch into a group including a K color component (S24). In the case where a color patch includes no K color component (No in S23), the data classifying unit 45 classifies RGB data and Lab data of that color patch into a group including no K color component (S25). The image processing device 40 performs the processing in steps S22 to S25 for all color patches read by the image reading device 20.

In the case where the processing in steps S22 to S25 of all color patches ends (Yes in S26), the color conversion information generating unit 46 generates an LUT including K (first LUT) for converting RGB data to Lab data, on the basis of multiple items of RGB data including a K color component and multiple items of Lab data including a K color component (S27). In addition, the color conversion information generating unit 46 generates an LUT including no K (second LUT) for converting RGB data to Lab data, on the basis of multiple items of RGB data including no K color component and multiple items of Lab data including no K color component (S27).

The accuracy evaluation unit 47 selects one of the LUT including K and the LUT including no K for each color patch by evaluating the LUT including K and the LUT including no K for each color patch (S28).

Figure 10:
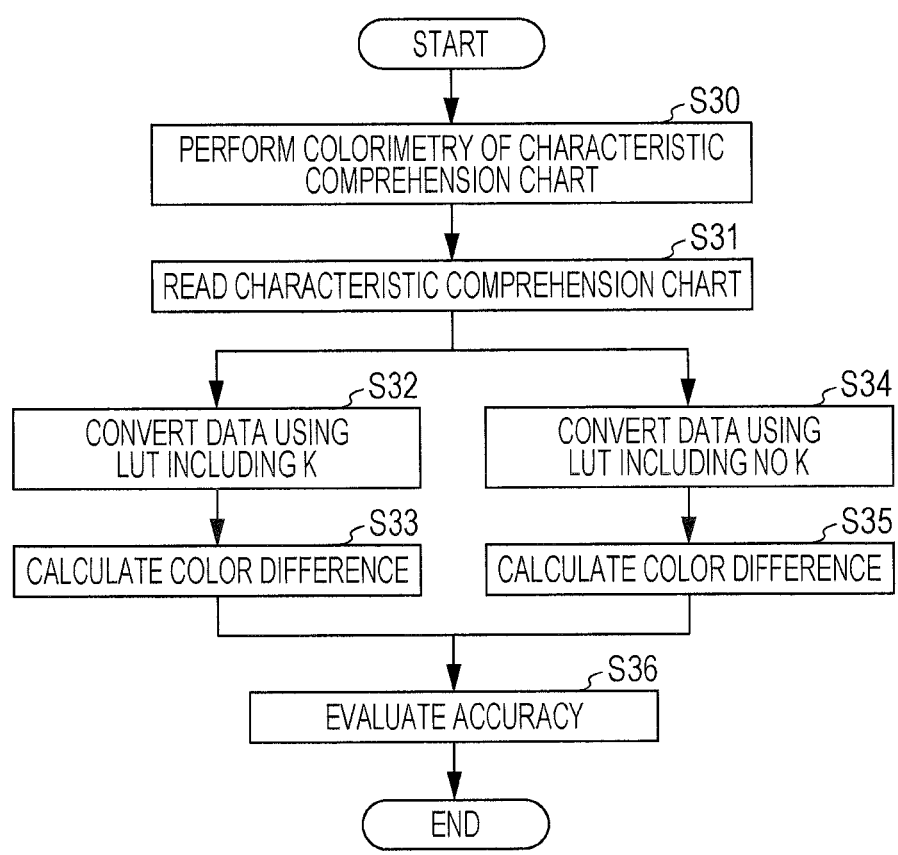
FIG. 10 is a flowchart illustrating an example of an evaluation process according to the second exemplary embodiment.

Here, with reference to the flowchart illustrated in FIG. 10, a process performed by the accuracy evaluation unit 47 will be described. First, the colorimeter 21 performs colorimetry of a color patch formed in the characteristic comprehension chart 100, thereby generating Lab data of the color patch (measurement Lab data) (S30). If the color patch has already been subjected to colorimetry, the processing in step S30 is dispensable. In addition, the image reading device 20 reads the color patch, thereby generating RGB data of the color patch (S31). If the color patch has already been read to generate RGB data, the processing in step S31 is dispensable.

Using the LUT including K, the accuracy evaluation unit 47 converts the RGB data of the color patch to Lab data (Lab data including K) (S32). The accuracy evaluation unit 47 obtains the difference (first difference) between the Lab data including K and the measurement Lab data (S33).

In addition, using the LUT including no K, the accuracy evaluation unit 47 converts the RGB data of the color patch to Lab data (Lab data including no K) (S34). The accuracy evaluation unit 47 obtains the difference (second difference) between the Lab data including no K and the measurement Lab data (S35).

The accuracy evaluation unit 47 compares the first difference and the second difference, and selects an LUT (conversion parameter) with a smaller difference as an LUT (conversion parameter) for the color patch, from among the LUT including K and the LUT including no K (S36). The accuracy evaluation unit 47 evaluates the LUT including K and the LUT including no K for each color patch, and selects one of the LUT including K and the LUT including no K for each color patch.

Next, referring back to FIGS. 8 and 9, the integrating unit 48 integrates the LUT including K and the LUT including no K for each color patch, selected by the accuracy evaluation unit 47, thereby generating an integrated LUT (S29). At this time, the integrating unit 48 may generate an integrated LUT by performing a weighted addition, averaging processing, or smoothing processing, for example, of the LUT including K and the LUT including no K.

As described above, by integrating the LUT including K and the LUT including no K on the basis of the evaluation results of the LUT including K and the LUT including no K, color conversion information to be used is generated without paying attention to the presence of a K color component. In addition, as in the first exemplary embodiment, by separately generating the LUT including K and the LUT including no K serving as color conversion information (RGB data and Lab data) while making a distinction between data (RGB data and Lab data) including a K color component and data (RGB data and Lab data) including no K color component, more accurate LUTs are generated, compared with the case in which LUTs are generated without making a distinction between the two types of data. In the second exemplary embodiment, the LUT including K and the LUT including no K are evaluated, and an LUT with higher evaluation result is adopted. Therefore, LUTs with yet higher accuracy are generated.

Note that, as in the first exemplary embodiment, the specific color component is not limited to a K color component and may be a color component that causes the corresponding relationship between RGB data and Lab data to be non-linear.

In addition, in the case where color patches are formed with color materials including multiple specific color components, the image processing device 40 may generate three or more items of color conversion information.

Figure 11:
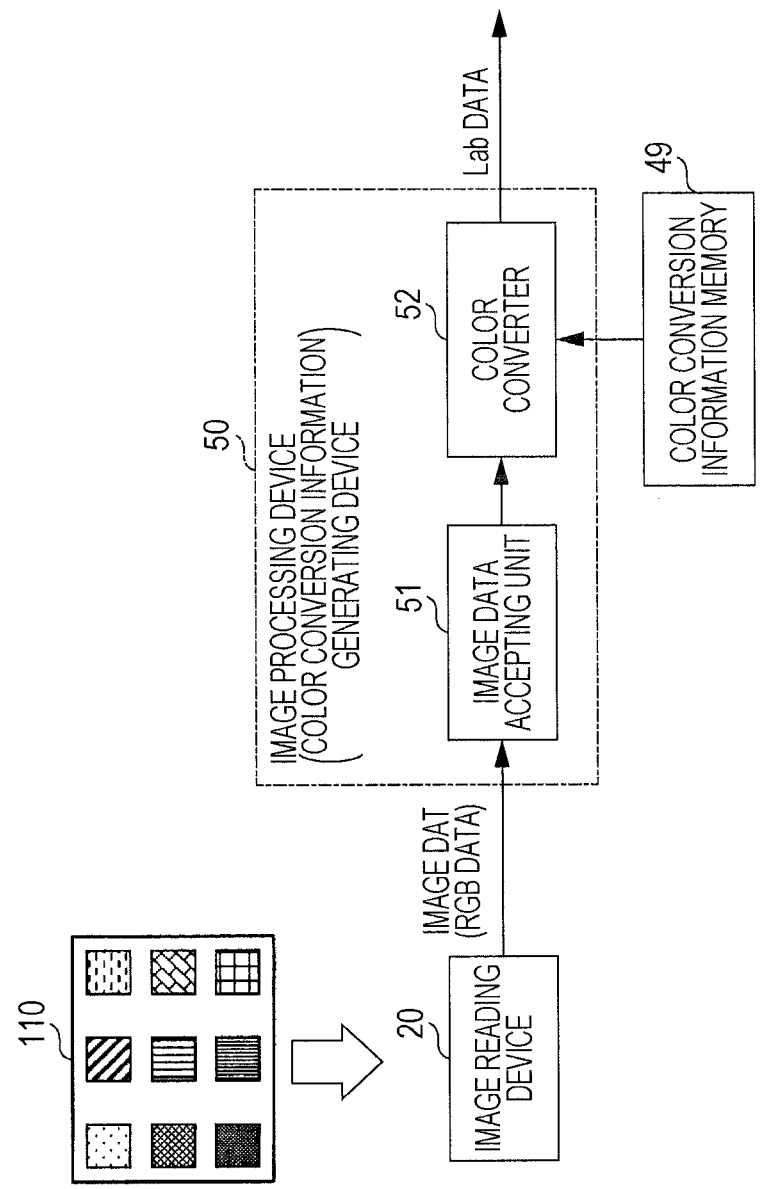
FIG. 11 is a block diagram illustrating an example of an image processing device (color conversion device) according to the second exemplary embodiment.

Next, a color conversion device that performs color conversion using the integrated LUT will be described. FIG. 11 illustrates an example of an image processing device (color conversion device) according to the second exemplary embodiment. An image processing device 50 (color conversion device) according to the second exemplary embodiment includes an image data accepting unit 51 and a color converter 52, and converts data in a device-dependent color space to data in a device-independent color space by using the integrated LUT. In the second exemplary embodiment, for example, the case in which the image processing device 50 converts RGB data generated by reading the evaluation chart 110 to Lab data will be described. Note that the image processing device 50 may be included in the image processing device 40 or may be included in the image reading device 20.

As in the first exemplary embodiment, the image reading device 20 generates image data (RGB data) of each color patch formed in the evaluation chart 110 by reading the color patch.

The image data accepting unit 51 accepts image data (RGB data) of each color patch, which is generated by the image reading device 20. The color converter 52 converts the RGB data to Lab data using the integrated LUT. In the second exemplary embodiment, color conversion is performed using the integrated LUT, regardless of the presence of a K color component.

Figure 12:
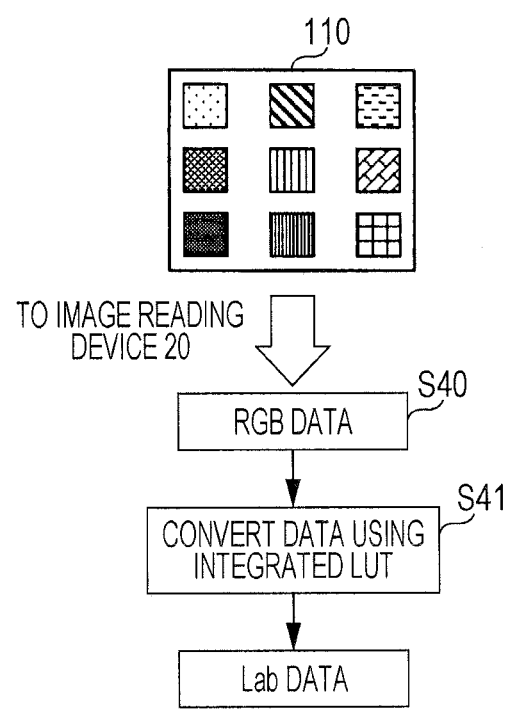
FIG. 12 is a flowchart illustrating an example of a color conversion process according to the second exemplary embodiment.

Next, with reference to the flowchart illustrated in FIG. 12, the operation of the image processing device 50 (image conversion device) according to the second exemplary embodiment will be described.

First, the image reading device 20 reads each color patch formed in the evaluation chart 110, thereby generating RGB data of the color patch (S40). The image data accepting unit 51 obtains the RGB data of each color patch from the image reading device 20. The color converter 52 converts the RGB data of each color patch to Lab data by using the integrated LUT (S41).

As described above, by using the integrated LUT integrating the LUT including K and the LUT including no K, data is converted without paying attention to the presence of a K color component in each color patch. That is, since it is unnecessary to switch between the LUTs in accordance with the presence of a K color component in each color patch, data conversion is more simply performed. In addition, by evaluating the LUT including K and the LUT including no K and converting data using the integrated LUT generated from LUTs with higher evaluation results, the accuracy of conversion is improved, compared with the case in which conversion is performed using color conversion information generated without making a distinction between data (RGB data and Lab data) including a K color component and data (RGB data and Lab data) including no K color component.

Note that the image processing device 40 according to the second exemplary embodiment may classify RGB data and Lab data on the basis of the lightness (L*) of each color patch, and may generate color conversion information on the basis of the classified data, as in the first exemplary embodiment.

In addition, the first to third exemplary applications may be performed using the image processing device 50 according to the second exemplary embodiment. In the case where the image processing device 50 according to the second exemplary embodiment is used, the same effects as those achieved in the first exemplary embodiment are achieved.

Note that the above-described image processing devices 40 and 50 are realized by cooperation between hardware resources and software, for example. Specifically, the image processing devices 40 and 50 each include a processor such as a CPU that is not illustrated in the drawings. The processor reads and executes a program stored in a memory device that is not illustrated in the drawings, thereby realizing the functions of the image processing devices 40 and 50. The program is stored in the memory device via a storage medium such as a CD or a DVD or communication means such as a network.

Third Exemplary Embodiment

Figure 13:
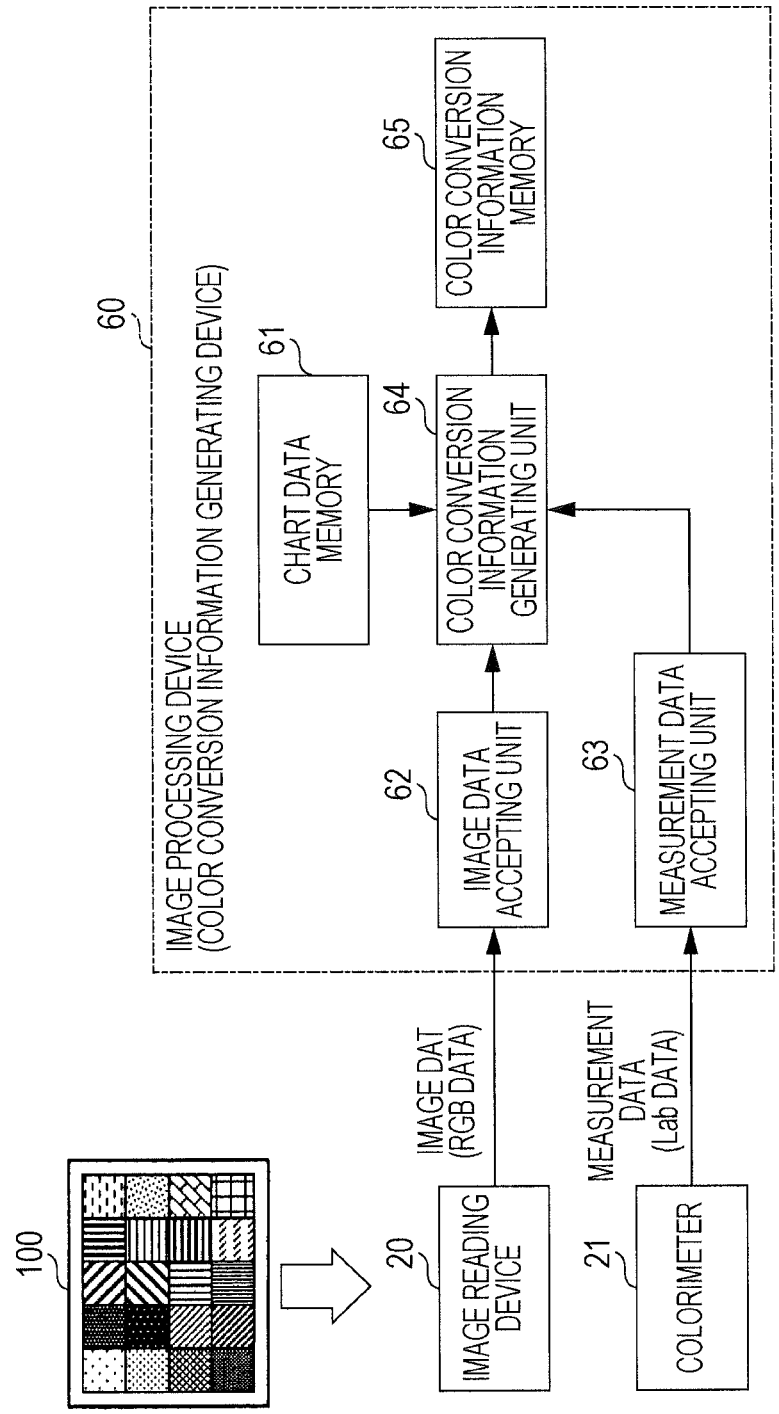
FIG. 13 is a block diagram illustrating an example of an image processing device (color conversion information generating device) according to a third exemplary embodiment.

Next, a third exemplary embodiment of the present invention will be described. FIG. 13 illustrates an example of an image processing device (color conversion information generating device) according to the third exemplary embodiment of the present invention. An image processing device 60 (color information generating device) according to the third exemplary embodiment generates color conversion information for converting data in a device-dependent color space to data in a device-independent color space.

As in the first exemplary embodiment, the image reading device 20 generates image data (RGB data) of each color patch formed in the characteristic comprehension chart 100 by reading the color patch. In addition, the colorimeter 21 performs colorimetry of each color patch formed in the characteristic comprehension chart 100, and outputs the measurement data (Lab data) of each color patch.

The image processing device 60 according to the third exemplary embodiment includes a chart data memory 61, an image data accepting unit 62, a measurement data accepting unit 63, a color conversion information generating unit 64, and a color conversion information memory 65. Note that the image processing device 60 may be included in the image reading device 20.

The chart data memory 61 stores chart layout information indicating the amount of a specific color component in each color patch of the characteristic comprehension chart 100. Also in the third exemplary embodiment, the specific color component is, for example, a black component (K color component). However, the specific color component is not limited to a K color component, as in the first exemplary embodiment.

The image data accepting unit 62 accepts image data (RGB data) of each color patch, which is generated by the image reading device 20.

The measurement data accepting unit 63 accepts measurement data (Lab data) of each color patch, which is measured by the colorimeter 21.

The color conversion information generating unit 64 obtains, from the chart data memory 61, information indicating the amount of a K color component (K data) in RGB data (color patch) obtained by the image data accepting unit 62. The color conversion information generating unit 64 generates RGBK data by adding the K data to the RGB data. The color conversion information generating unit 64 generates RGBK data for each color patch. The color conversion information generating unit 64 generates RGBK color conversion information (third color conversion information) for converting RGBK data to Lab data on the basis of multiple items of RGBK data and multiple items of Lab data. The RGBK color conversion information may be a function (color conversion model) indicating the conversion characteristics between RGBK data and Lab data, or a table such as an LUT.

The color conversion information memory 65 stores the RGBK color conversion information.

Figure 14:
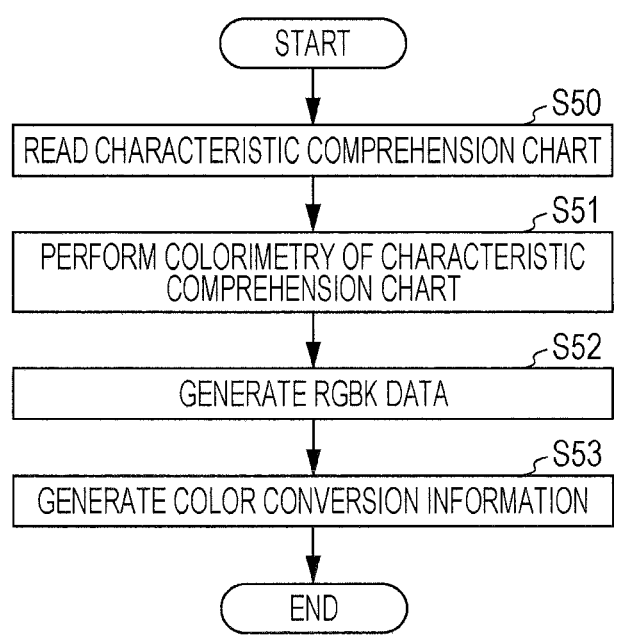
FIG. 14 is a flowchart illustrating an example of a color conversion information generating process according to the third exemplary embodiment.
Figure 15:
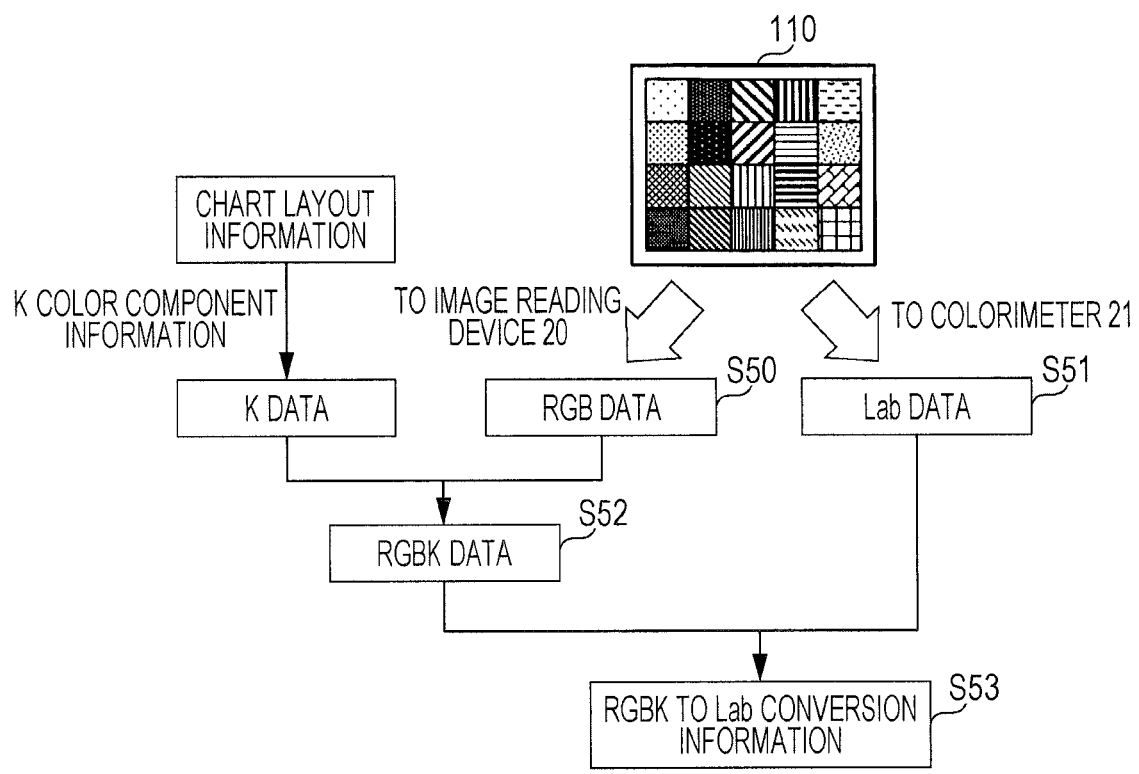
FIG. 15 is a flowchart illustrating an example of a color conversion information generating process according to the third exemplary embodiment.

Next, with reference to the flowcharts illustrated in FIGS. 14 and 15, the operation of the image processing device 60 (color conversion information generating device) according to the third exemplary embodiment will be described.

First, the image reading device 20 reads each color patch formed in the characteristic comprehension chart 100, thereby generating RGB data of the color patch (S50). The image data accepting unit 62 obtains the RGB data of each color patch from the image reading device 20.

In addition, the colorimeter 21 performs colorimetry of each color patch formed in the characteristic comprehension chart 100 (S51). The measurement data accepting unit 63 obtains Lab data of each color patch from the colorimeter 21.

The color conversion information generating unit 64 obtains K data indicating the amount of a K color component in a color patch from the chart data memory 61, and adds the K data to the RGB data of the color patch, thereby generating RGBK data (S52). The color conversion information generating unit 64 generates RGBK data for all color patches.

The color conversion information generating unit 64 generates RGBK color conversion information for converting RGBK data to Lab data on the basis of multiple items of RGBK data and multiple items of Lab data (S53). The color conversion information memory 65 stores the RGBK color conversion information.

As described above, by generating RGBK data by adding K data indicating the amount of a K color component to RGB data and by generating RGBK color conversion information on the basis of RGBK data and Lab data, the amount of a K color component is reflected in RGBK color conversion information. Therefore, more accurate color conversion information is generated, compared with the case in which color conversion information is generated on the basis of RGB data and Lab data. That is, by using a K color component as one parameter, color conversion information with which Lab data in accordance with the amount of a K color component is obtained is generated.

Figure 16:
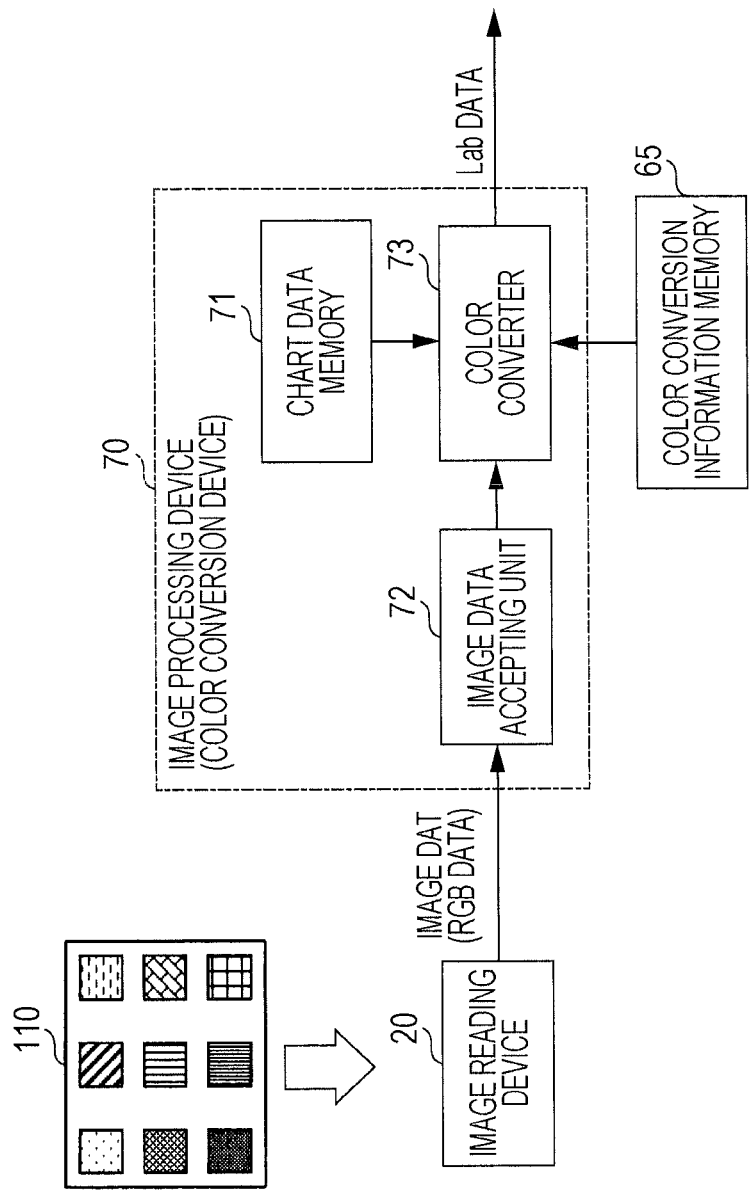
FIG. 16 is a block diagram illustrating an example of an image processing device (color conversion device) according to the third exemplary embodiment.

Next, a color conversion device that performs color conversion using the RGBK color conversion information will be described. FIG. 16 illustrates an example of an image processing device (color conversion device) 70 according to the third exemplary embodiment. The image processing device 70 (color conversion device) according to the third exemplary embodiment generates RGBK data by adding K data to data in a device-dependent color space (RGB data), and converts the RGBK data to data in a device-independent color space (Lab data) by using RGBK color conversion information. In the third exemplary embodiment, for example, the case in which the image processing device 70 adds K data to RGB data generated by reading the evaluation chart 110 and converts RGBK data to Lab data will be described. Note that the image processing device 70 may be included in the image processing device 60 or may be included in the image reading device 20.

As in the first exemplary embodiment, the image reading device 20 generates image data (RGB data) of each color patch formed in the evaluation chart 110 by reading the color patch.

The image processing device 70 according to the third exemplary embodiment includes a chart data memory 71, an image data accepting unit 72, and a color converter 73.

The chart data memory 71 stores chart layout information indicating the amount of a specific color component in each color patch in the evaluation chart 110. In the third exemplary embodiment, the specific color component is, for example, a K color component. Note that the specific color component is not limited to a K color component and may be another color component.

The image data accepting unit 72 accepts image data (RGB data) of each color patch, which is generated by the image reading device 20.

The color converter 73 obtains, from the chart data memory 71, K data indicating the amount of a K color component in RGB data (color patch) obtained by the image data accepting unit 62. The color converter 73 generates RGBK data by adding the K data to the RGB data. The color converter 73 generates RGBK data for each color patch by adding K data to RGB data for each color patch. The color converter 73 converts RGBK data to Lab data by using RGBK color conversion information.

Figure 17:
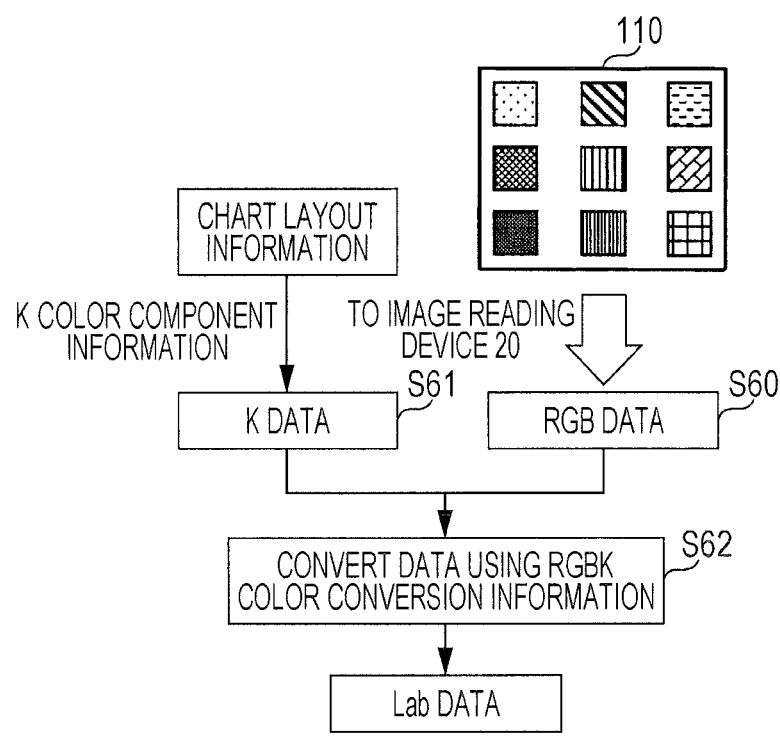
FIG. 17 is a flowchart illustrating an example of a color conversion process according to the third exemplary embodiment.

Next, with reference to the flowchart illustrated in FIG. 17, the operation of the image processing device 70 (image conversion device) according to the third exemplary embodiment will be described.

First, the image reading device 20 reads each color patch formed in the evaluation chart 110, thereby generating RGB data of the color patch (S60). The image data accepting unit 72 obtains the RGB data of each color patch from the image reading device 20.

The color converter 73 obtains, from the chart data memory 71, K data indicating the amount of a K color component in RGB data (color patch) (S61). The color converter 73 adds the K data to the RGB data, thereby generating RGBK data.

The color converter 73 converts the RGBK data to Lab data by using RGBK color conversion information (S62).

As described above, by generating RGBK data by adding K data to RGB data and by converting the RGBK data to Lab data using RGBK color conversion information that reflects the amount of a K color component, Lab data in accordance with the amount of a K color component is obtained. Therefore, the accuracy of conversion is improved, compared with the case in which RGB data is converted to Lab data. That is, by performing data conversion using a K color component as one parameter, Lab data in accordance with the amount of a K color component is generated, and hence the accuracy of conversion is improved, compared with the case in which data conversion is performed without using a K color component as a parameter. More specifically, by adding K data, which is the original data, to the read data (RGB data), even a color that is difficult to be distinctively represented only using the read data is clearly and distinctively represented. This is, so to speak, refinement or extension of the read data. That is, the conversion accuracy is improved.

In addition, the first to third exemplary applications may be performed using the image processing device 70 according to the third exemplary embodiment. In the case where the image processing device 70 according to the third exemplary embodiment is used, the same effects as those achieved in the first exemplary embodiment are achieved.

Note that the above-described image processing devices 60 and 70 are realized by cooperation between hardware resources and software, for example. Specifically, the image processing devices 60 and 70 each include a processor such as a CPU that is not illustrated in the drawings. The processor reads and executes a program stored in a memory device that is not illustrated in the drawings, thereby realizing the functions of the image processing devices 60 and 70. The program is stored in the memory device via a storage medium such as a CD or a DVD or communication means such as a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
    a first accepting unit that accepts a first read data group in a device-dependent color space that is generated by reading a first color patch group including a specific color component and a first reference data group in a device-independent color space corresponding to the first color patch group;
    a second accepting unit that accepts a second read data group in a device-dependent color space that is generated by reading a second color patch group not having the specific color component and a second reference data group in a device-independent color space corresponding to the second color patch group;
    a first conversion information generating unit that generates first conversion information for converting input data in the device-dependent color space to output data in the device-independent color space, on the basis of the first read data group and the first reference data group; and
    a second conversion information generating unit that generates second conversion information for converting input data in the device-dependent color space to output data in the device-independent color space, on the basis of the second read data group and the second reference data group.

2. The image processing device according to claim 1, wherein a plurality of items of read data includes the first read data group generated by reading the first color patch group, and the second read data group generated by reading the second color patch group,
    wherein the first and second conversion information generating units include,
        an identifying unit that identifies the first read data group and the second read data group and identifies the first reference data group and the second reference data group in accordance with a plurality of items of specific color component data each indicating a specific color component in a corresponding color patch group, and
    wherein the first conversion information and the second conversion information are used as conversion information for converting the input data to the output data.

3. The image processing device according to claim 1, further comprising a converter that converts the input data to the output data by using the conversion information,
    wherein the converter includes,
        a unit that converts the input data to the output data by using the first conversion information in a case where the input data includes a specific color component, and
        a unit that converts the input data to the output data by using the second conversion information in a case where the input data does not include the specific color component.

4. The image processing device according to claim 2, further comprising a converter that converts the input data to the output data by using the conversion information,
wherein the converter includes,
a unit that converts the input data to the output data by using the first conversion information in a case where the input data includes a specific color component, and
a unit that converts the input data to the output data by using the second conversion information in a case where the input data does not include the specific color component.

5. The image processing device according to claim 1, wherein the first and second conversion information generating units further include an integrated conversion information generating unit that generates integrated conversion information by evaluating the first conversion information and the second conversion information in units of color patches and integrating the first conversion information and the second conversion information on the basis of evaluation results, and
wherein the input data is converted to the output data by using the integrated conversion information.

6. The image processing device according to claim 2, wherein the first and second conversion information generating units further include an integrated conversion information generating unit that generates integrated conversion information by evaluating the first conversion information and the second conversion information in units of color patches and integrating the first conversion information and the second conversion information on the basis of evaluation results, and
wherein the input data is converted to the output data by using the integrated conversion information.

7. The image processing device according to claim 5, wherein the integrated conversion information generating unit includes,
an evaluation unit that obtains a first difference between output data generated by converting read data of a color patch by using the first conversion information and reference data in the device-independent color space of the color patch, obtains a second difference between output data generated by converting the read data of the color patch by using the second conversion information and the reference data of the color patch, and evaluates the first difference and the second difference, and
an integrating unit that selects, as an element of the integrated conversion information, one of the first conversion information and the second conversion information in units of color patches on the basis of evaluation results obtained by the evaluation unit.

8. The image processing device according to claim 6, wherein the integrated conversion information generating unit includes,
an evaluation unit that obtains a first difference between output data generated by converting read data of a color patch by using the first conversion information and reference data in the device-independent color space of the color patch, obtains a second difference between output data generated by converting the read data of the color patch by using the second conversion information and the reference data of the color patch, and evaluates the first difference and the second difference, and
an integrating unit that selects, as an element of the integrated conversion information, one of the first conversion information and the second conversion information in units of color patches on the basis of evaluation results obtained by the evaluation unit.

9. The image processing device according to claim 1, wherein the first and second conversion information generating units generate the conversion information by associating, for each of a plurality of color patches of the first and second color patch groups, an extended data set configured by adding each of a plurality of items of specific color component data to a corresponding one of a plurality of items of read data, with a corresponding one of the plurality of items of a corresponding reference data group.

10. The image processing device according to claim 9, further comprising a converter that generates extended input data by adding the specific color component data to read data for each unit image generated by reading a target image for which the specific color component is managed for each unit image, and converts the extended input data to the output data by using the conversion information.

11. The image processing device according to claim 1, wherein the specific color component is a black component.

12. An image processing method comprising:
accepting a first read data group in a device-dependent color space that is generated by reading a first color patch group including a specific color component and a first reference data group in a device-independent color space corresponding to the first color patch group;
accepting a second read data group in a device-dependent color space that is generated by reading a second color patch group including not having the specific color component and a second reference data group in a device-independent color space corresponding to the second color patch group;
generating first conversion information for converting input data in the device-dependent color space to output data in the device-independent color space, on the basis of the first read data group and the first reference data group;
generating second conversion information for converting input data in the device-dependent color space to output data in the device-independent color space, on the basis of the second read data group and the second reference data group.

13. A non-transitory computer readable medium storing a program causing a computer to execute a process, the process comprising:
accepting a first read data group in a device-dependent color space that is generated by reading a first color patch group including a specific color component and a first reference data group in a device-independent color space corresponding to the first color patch group;
accepting a second read data group in a device-dependent color space that is generated by reading a second color patch group including not having the specific color component and a second reference data group in a device-independent color space corresponding to the second color patch group;
generating first conversion information for converting input data in the device-dependent color space to output data in the device-independent color space, on the basis of the first read data group and the first reference data group; and
generating second conversion information for converting input data in the device-dependent color space to output data in the device-independent color space, on the basis of the second read data group and the second reference data group.

* * * * *